(12) United States Patent
Ji et al.

(10) Patent No.: US 11,385,078 B2
(45) Date of Patent: Jul. 12, 2022

(54) ROTATION SENSING APPARATUS

(71) Applicant: SAMSUNG ELECTRO-MECHANICS CO., LTD., Suwon-si (KR)

(72) Inventors: Yong Woon Ji, Suwon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 330 days.

(21) Appl. No.: 16/532,836

(22) Filed: Aug. 6, 2019

(65) Prior Publication Data
US 2020/0166378 A1 May 28, 2020

(30) Foreign Application Priority Data

Nov. 23, 2018 (KR) .................... 10-2018-0146633
Apr. 15, 2019 (KR) .................... 10-2019-0043607

(51) Int. Cl.
*G01D 5/22* (2006.01)
(52) U.S. Cl.
CPC .................................. *G01D 5/22* (2013.01)
(58) Field of Classification Search
CPC ............................................. G01D 5/12–25
See application file for complete search history.

(56) References Cited

U.S. PATENT DOCUMENTS

| | | | |
|---|---|---|---|
| 2003/0192386 A1* | 10/2003 | Tokumoto | B62D 15/02 73/862.334 |
| 2010/0176799 A1* | 7/2010 | Ausserlechner | G01B 7/30 324/207.2 |
| 2014/0354270 A1* | 12/2014 | Kawano | G01B 7/003 324/207.21 |
| 2015/0253153 A1* | 9/2015 | Smithanik | G01D 5/2013 324/207.25 |
| 2016/0069712 A1 | 3/2016 | Holenarsipur et al. | |
| 2016/0123769 A1 | 5/2016 | Nishimoto et al. | |
| 2016/0153807 A1* | 6/2016 | Zuta | G01P 3/487 324/207.2 |
| 2016/0231139 A1 | 8/2016 | Mizutani | |
| 2017/0089735 A1 | 3/2017 | Ruh | |
| 2018/0154926 A1* | 6/2018 | Ohira | B62D 15/02 |
| 2020/0049482 A1* | 2/2020 | Ives | G01B 7/14 |

FOREIGN PATENT DOCUMENTS

| | | |
|---|---|---|
| JP | 2016-145729 A | 8/2016 |
| JP | 6217596 B2 | 10/2017 |

\* cited by examiner

*Primary Examiner* — Steven L Yeninas
(74) *Attorney, Agent, or Firm* — NSIP Law

(57) ABSTRACT

A rotation sensing apparatus includes a detected part including a first pattern portion with a plurality of first patterns and a second pattern portion with a plurality of second patterns; a first sensor disposed opposite to the first pattern portion; a second sensor disposed opposite to the second pattern portion; a third sensor disposed at an angle from the first sensor and disposed opposite to the first pattern portion; a fourth sensor disposed at an angle from the second sensor and disposed opposite to the second pattern portion; and a rotation information calculation circuit to calculate rotation information regarding rotation of a rotating body based on first, second, third, and fourth oscillation signals associated with outputs of the first, second, third, and fourth sensors and to compensate for nonlinearity of a differential signal generated based on the first, second, third, and fourth oscillation signals.

16 Claims, 17 Drawing Sheets

ROTATION SENSING APPARATUS

CROSS-REFERENCE TO RELATED APPLICATIONS

This application claims the benefit under 35 USC 119(a) of Korean Patent Application No. 10-2018-0146633 filed on Nov. 23, 2018 and Korean Patent Application No. 10-2019-0043607 filed on Apr. 15, 2019 in the Korean Intellectual Property Office, the entire disclosures of which are incorporated herein by reference for all purposes.

BACKGROUND

The following description relates to a rotation sensing apparatus.

Rotating bodies are applied to various fields such as a motor and a wheel switch of a wearable device which are required to be reduced in size and slimmed. According to such a trend, a sensing circuit for sensing a position of a rotating body is also required to detect a minute displacement of the rotating body.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a rotation sensing apparatus capable of compensating for a process error of a rotating body and a tilt of a rotary shaft.

In one general aspect, a rotation sensing apparatus includes: a detected part including a first pattern portion with a plurality of first patterns and a second pattern portion with a plurality of second patterns; a first sensor disposed opposite to the first pattern portion; a second sensor disposed opposite to the second pattern portion; a third sensor disposed at an angle from the first sensor and disposed opposite to the first pattern portion; a fourth sensor disposed at an angle from the second sensor and disposed opposite to the second pattern portion; and a rotation information calculation circuit. The rotation information calculation circuit calculates rotation information regarding rotation of a rotating body in response to a first oscillation signal generated based on an output of the first sensor, a second oscillation signal generated based on an output of the second sensor, a third oscillation signal generated based on an output of the third sensor, and a fourth oscillation signal generated based on an output of the fourth sensor. The rotation information calculation circuit compensates for nonlinearity of a differential signal generated by a difference between the first oscillation signal and the second oscillation signal, in response to an oscillation signal corresponding to one of a maximum frequency and a minimum frequency, from among the first oscillation signal, the second oscillation signal, the third oscillation signal, and the fourth oscillation signal.

In another general aspect, a rotation sensing apparatus includes: a first sensor disposed opposite to a plurality of first patterns; a second sensor disposed opposite to a plurality of second patterns, which has a certain angle difference from the plurality of first patterns; a third sensor disposed opposite to the plurality of first patterns and having a certain angle difference from the first sensor; a fourth sensor disposed opposite to the plurality of second patterns and having a certain angle difference from the second sensor; and a rotation information calculation circuit. The rotation information calculation circuit calculates rotation information regarding rotation of a rotating body, in response to a first sensing signal generated based on an output of the first sensor, a second sensing signal generated based on an output of the second sensor, a third sensing signal generated based on an output of the third sensor, and a fourth sensing signal generated based on an output of the fourth sensor. The rotation information calculation circuit compensates for nonlinearity of a differential signal generated by a difference between the first sensing signal and the second sensing signal, in response to a sensing signal corresponding to one of a maximum frequency and a minimum frequency, from among the first sensing signal, the second sensing signal, the third sensing signal, and the fourth sensing signal.

The rotation information calculation circuit may determine that the differential signal has a first nonlinearity in a case in which the oscillation/sensing signal corresponding to one of the maximum frequency and the minimum frequency corresponds to one of the first oscillation/sensing signal and the second oscillation/sensing signal.

The rotation information calculation circuit may determine that the differential signal has a second nonlinearity different from the first nonlinearity in a case in which the oscillation/sensing signal corresponding to one of the maximum frequency and the minimum frequency corresponds to one of the third oscillation/sensing signal and the fourth oscillation/sensing signal.

The rotation information calculation circuit may apply a first compensation algorithm, compensating for the first nonlinearity, to the differential signal, in the case in which the differential signal is determined as having the first nonlinearity, and may apply a second compensation algorithm, compensating for the second nonlinearity, to the differential signal, in the case in which the differential signal is determined as having the second nonlinearity.

The rotation information calculation circuit may generate a first average signal by averaging the first oscillation/sensing signal and the second oscillation/sensing signal, and may generate a second average signal by averaging the third oscillation/sensing signal and the fourth oscillation/sensing signal.

The rotation information calculation circuit may generate a first subtraction signal by subtracting the first average signal from the first oscillation/sensing signal, and may generate a second subtraction signal by subtracting the second average signal from the second oscillation/sensing signal.

The rotation information calculation circuit may generate a first adjustment signal by a ratio of a frequency of the first subtraction signal to a difference between the maximum frequency and a frequency of the first average signal, and may generate a second adjustment signal by a ratio of a frequency of the second subtraction signal to a difference between the maximum frequency and a frequency of the second average signal.

The rotation information calculation circuit may generate the differential signal by subtracting the second adjustment signal from the first adjustment signal.

The first oscillation/sensing signal and the third oscillation/sensing signal may have a phase difference of 180 degrees, and the second oscillation/sensing signal and the fourth oscillation/sensing signal may have a phase difference of 180 degrees.

The first oscillation/sensing signal and the second oscillation/sensing signal may have a phase difference of 90 degrees, and the third oscillation/sensing signal and the fourth oscillation/sensing signal may have a phase difference of 90 degrees.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
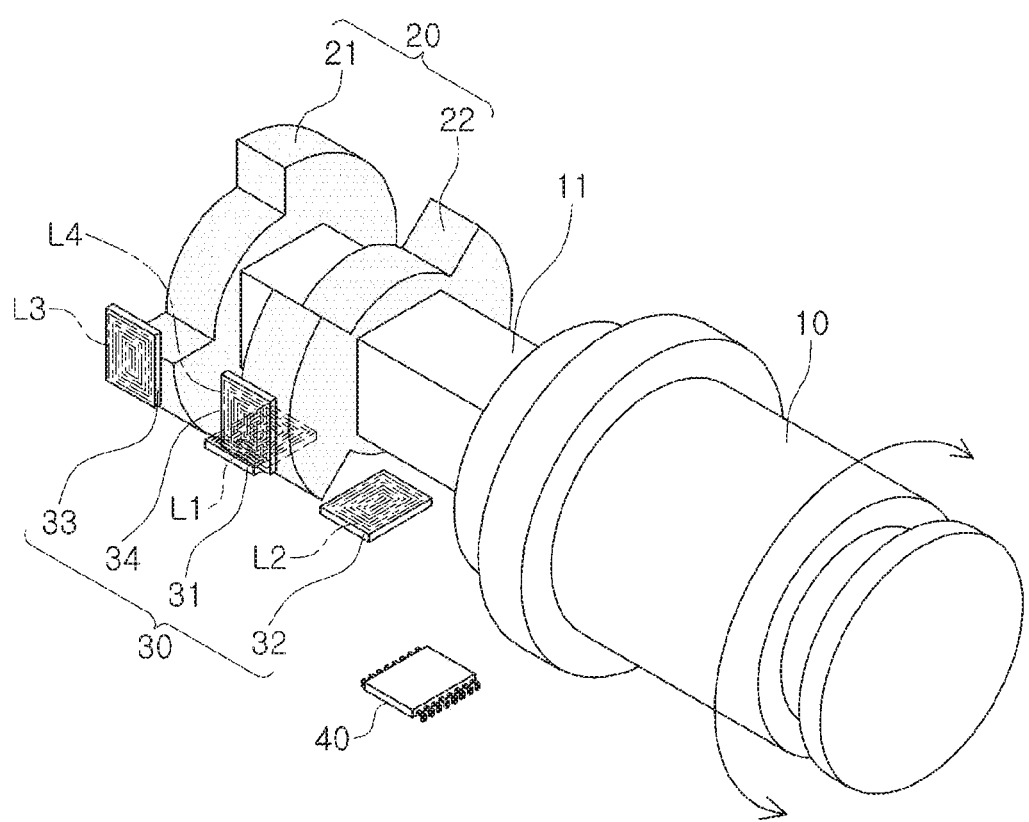
FIG. 1A is a configuration diagram of a rotation sensing apparatus according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depictions of elements in the drawings may be exaggerated for clarity, illustration, and convenience.

Subsequently, examples are described in further detail with reference to the accompanying drawings.

In addition, throughout the specification, 'including' indicates that other elements may be included, rather than excluding other elements, unless specifically stated otherwise.

Hereinafter, examples of the present disclosure will be described in detail with reference to the accompanying drawings so that those skilled in the art may easily carry out the present disclosure.

Figure 1B:
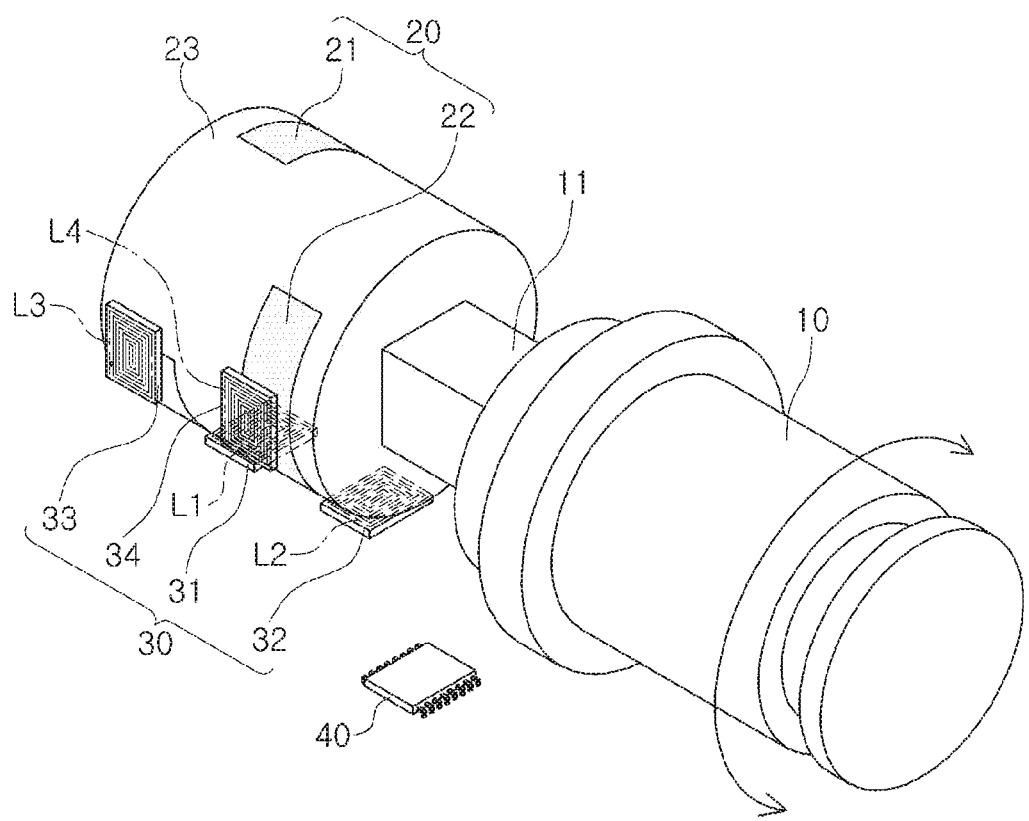
FIG. 1B is a configuration diagram illustrating a modified example of the rotation sensing apparatus according to the example of FIG. 1A.
Figure 2A:
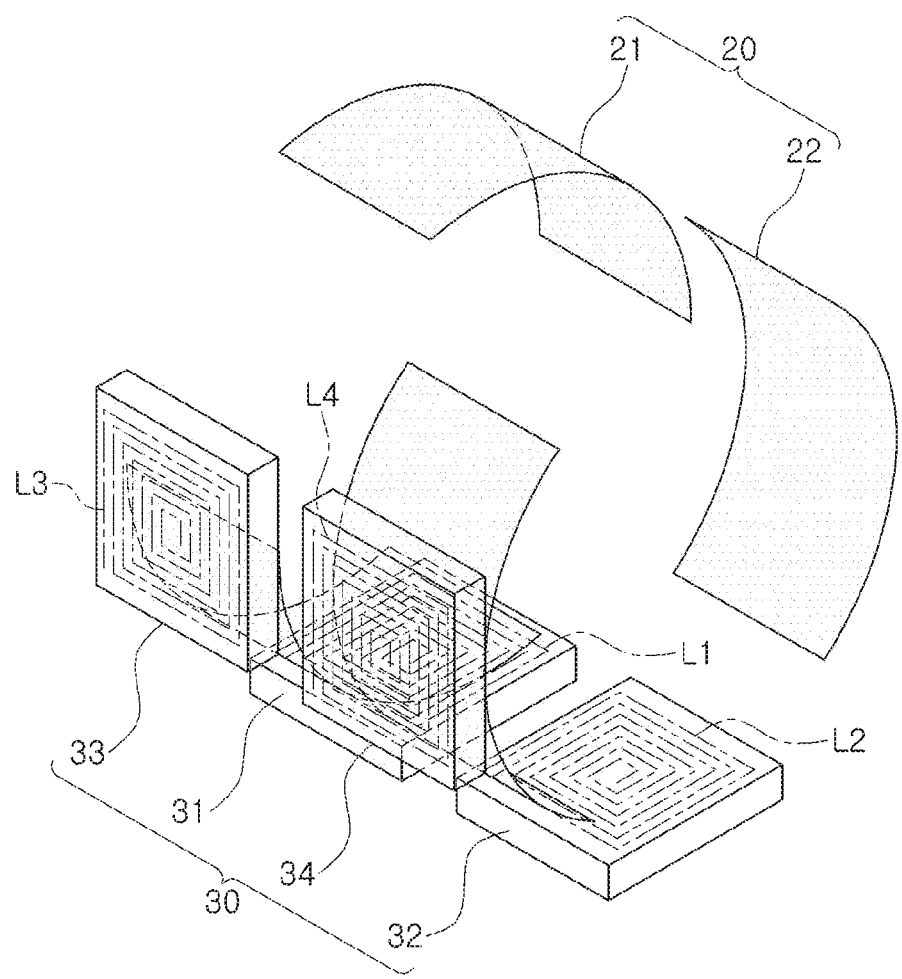
FIG. 2A is a schematic diagram of a pattern portion and a sensor unit according to an example.
Figure 2B:
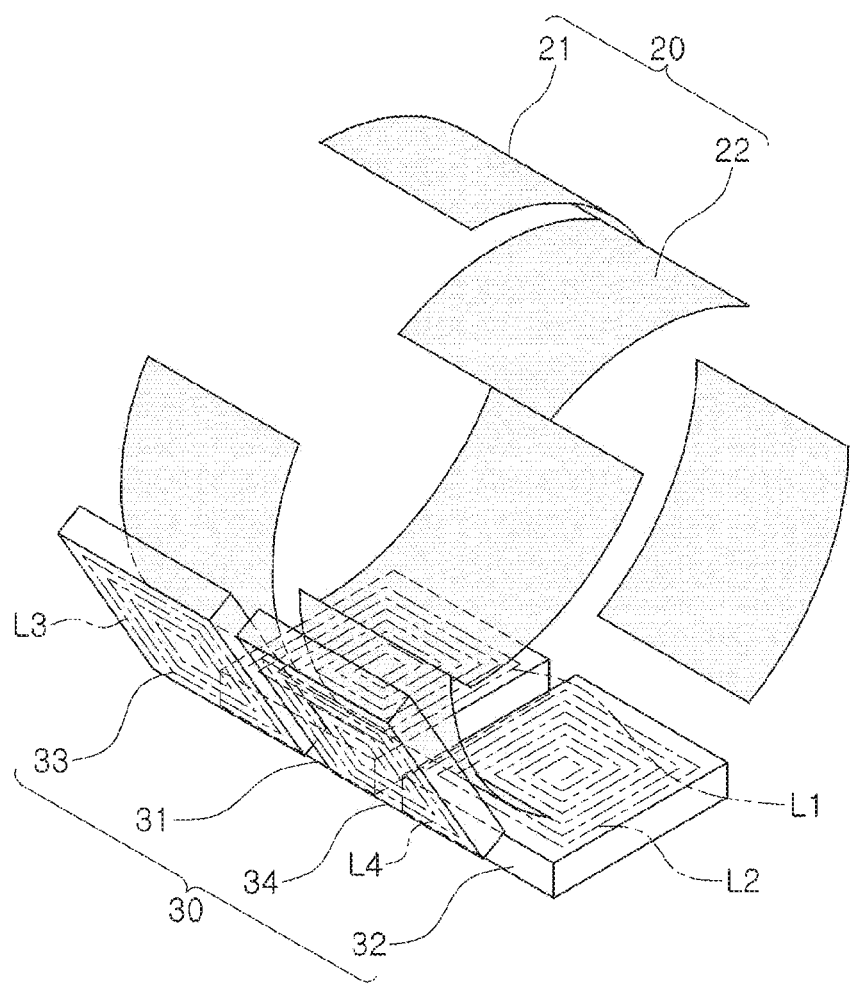
FIG. 2B is a schematic view of a pattern portion and a sensor unit according to another example.

FIG. 1A is a configuration diagram of a rotation sensing apparatus according to an example. FIG. 1B is a configuration diagram illustrating a modified example of the rotation sensing apparatus according to the example of FIG. 1A. FIG. 2A is a schematic diagram of a pattern portion and a sensor unit according to an example. FIG. 2B is a schematic view of a pattern portion and a sensor unit according to another example.

The rotation sensing apparatus according to an example may include a detected part 20, a sensor unit 30, and a rotation information calculation unit 40.

Referring to FIG. 1A, the detected part 20 may be connected to a wheel 10 through a rotary shaft 11. The wheel 10 may be a rotating body employed in an electronic device and rotated by a user in a clockwise or counterclockwise direction. The detected part 20 may rotate clockwise or counterclockwise together with the wheel 10.

The detected part 20 may include a first pattern portion 21 and a second pattern portion 22. The first pattern portion 21 and the second pattern portion 22 are formed to have the same shape, and are spaced apart from each other by a predetermined distance in an extending direction of the rotary shaft 11, and the first pattern portion 21 and the second pattern portion 22 are coupled to the rotary shaft 11. The first pattern portion 21 and the second pattern portion 22 coupled to the rotary shaft may rotate in the same direction and at the same speed when the rotating body rotates.

Each of the first pattern portion 21 and the second pattern portion 22 may include a plurality of patterns having the same shape. The first pattern portion 21 includes a plurality of first patterns, and the second pattern portion 22 includes a plurality of second patterns.

In FIG. 1A, protruded regions of the first pattern portion 21 and the second pattern portion 22 correspond to a pattern. For example, a plurality of first patterns of the first pattern portion 21 and a plurality of second patterns of the second pattern portion 22 may be manufactured by machining a disk-shaped metal and a magnetic body to form teeth. Accordingly, the plurality of first patterns of the first pattern portion 21 and the plurality of second patterns of the second pattern portion 22 may be formed of one of a metal and a magnetic body.

The plurality of first patterns of the first pattern portion 21 extend in a rotation direction and the plurality of second patterns of the second pattern portion 22 extend in the rotation direction. An extension length of the first pattern in the rotation direction may be defined by the size of the first pattern, and an extension length of the second pattern in the rotation direction may be defined by the size of the second pattern.

The plurality of first patterns of the first pattern portion 21 are spaced apart from each other by a predetermined distance in the rotation direction, and the plurality of second patterns of the second pattern portion 22 are spaced apart from each other by a predetermined distance. For example, a spacing distance between the plurality of first patterns of the first pattern portion 21 may be the same as the size of the first pattern, and a spacing distance between the plurality of second patterns of the second pattern portion 22 may be the same as a size of the second pattern.

As an example, referring to FIG. 2A, the plurality of first patterns of the first pattern portion 21 may have a size corresponding to a rotation angle of 90 degrees, and the spacing distance between the plurality of first patterns corresponds to the rotation angle of 90 degrees. Accordingly, the first pattern portion 21 may have two first patterns having a size of 90 degrees. Similarly, the plurality of second patterns of the second pattern portion 22 may have a size corresponding to a rotation angle of 90 degrees, and the spacing distance between the plurality of second patterns may correspond to the rotation angle of 90 degrees. Accordingly, the second pattern portion 22 may have two second patterns having a size of 90 degrees.

According to an example, the size and number of the first patterns and the second patterns may be changed. For example, referring to FIG. 2B, the first pattern portion 21 may have three first patterns having a size of 60 degrees, and the second pattern portion 22 may have three second patterns having a size of 60 degrees.

Hereinafter, for convenience of explanation, the first pattern portion 21 has two first patterns having a size of 90 degrees, and the second pattern portion 22 has two second patterns having a size of 90 degrees, which will be described. The following description may also be applied to a pattern portion having various angular sizes and various numbers of patterns.

The plurality of first patterns of the first pattern portion 21 and the plurality of second patterns of the second pattern portion 22 may be disposed to have a predetermined angle difference. For example, the plurality of first patterns of the first pattern portion 21 and the plurality of second patterns of the second pattern portion 22 may be disposed to have an angular difference corresponding to a half of the size of the first pattern and a half of the size of the second pattern.

Assuming that the first pattern portion 21 has two first patterns having a size of 90 degrees and the second pattern portion 22 has two second patterns having a size of 90 degrees, the plurality of first patterns of the first pattern portion 21 and the plurality of second patterns of the second pattern portion 22 may be disposed to have an angular difference of 45 degrees. Accordingly, the plurality of first patterns of the first pattern portion 21 and the plurality of second patterns of the second pattern portion 22 may partially overlap each other in a direction in which the rotary shaft 11 extends.

A sensing value output from a first sensor 31 and a sensing value output from a second sensor 32 may have a phase difference of 90 degrees by the angular difference between the first pattern portion 21 and the second pattern portion 22. In addition, a sensing value output from a third sensor 33 and a sensing value output from a fourth sensor 34 may have a phase difference of 90 degrees.

The sensor unit 30 may include a plurality of sensors. For example, the sensor unit 30 may include the first sensor 31, the second sensor 32, the third sensor 33, and the fourth sensor 34. The first sensor 31 and the second sensor 32 are disposed in the extending direction of the rotary shaft 11 on a first plane. The first sensor 31 is disposed opposite to the first pattern portion 21, and the second sensor 32 is disposed opposite to the second pattern portion 22. In addition, the third sensor 33 and the fourth sensor 34 are disposed in the extending direction of the rotary shaft 11 on a second plane. The third sensor 33 is disposed opposite to the first pattern portion 21, and the fourth sensor 34 is disposed opposite to the second pattern portion 22. The first plane and the second plane may be disposed to have a predetermined angle therebetween.

By the rotation of the first pattern portion 21 and the second pattern portion 22, the areas of the first sensor 31 and the third sensor 33 overlapping the first pattern of the first pattern portion 21 are changed, and the areas of the second sensor 32 and the fourth sensor 34 overlapping the second pattern of the second pattern portion 22 are changed. The first sensor 31 and the third sensor 33 sense a change in the area of overlap with the first pattern portion 21, and the second sensor 32 and the fourth sensor 34 sense a change in the area of overlap with the second pattern portion 22.

The first sensor 31, the second sensor 32, the third sensor 33, and the fourth sensor 34 may have a predetermined size. In this case, the sizes of the first sensor 31, the second sensor 32, the third sensor 33, and the fourth sensor 34 may be understood as a length corresponding to the direction in which the rotating body rotates. As an example, the sizes of the first sensor 31, the second sensor 32, the third sensor 33, and the fourth sensor 34 may correspond to the half of the sizes of the first pattern of the first pattern portion 21 and the second pattern of the second pattern portion 22.

The first sensor 31 and the third sensor 33 are disposed to have an angular difference corresponding to the size of the first pattern, and the second sensor 32 and the fourth sensor 34 are disposed to have an angular difference corresponding to the size of the second pattern. The first sensor 31 and the third sensor 33 are disposed to have an angular difference by the size of the first pattern, such that the sensing value output from the first sensor 31 and the sensing value output from the third sensor 33 may have a phase difference of 180 degrees. The second sensor 32 and the fourth sensor 34 are disposed to have an angular difference by the size of the second pattern, such that the sensing value output from the second sensor 32 and the sensing value output from the fourth sensor 34 may have a phase difference of 180 degrees.

As an example, in the case in which the first pattern portion 21 has two first patterns having a size corresponding to 90 degrees and a spacing distance corresponding to 90 degrees and the second pattern portion 22 has two second patterns having a size corresponding to 90 degrees and a spacing distance of 90 degrees, the third sensor 33 may be disposed to have an angular difference of 90 degrees with the first sensor 31, and the fourth sensor 34 may be disposed to have an angular difference of 90 degrees with the second sensor 32, as illustrated in FIG. 2A.

As another example, in the case in which the first pattern portion 21 has three first patterns having a size corresponding to 60 degrees and a spacing distance corresponding to 90 degrees and the second pattern portion 22 has three second patterns having a size corresponding to 60 degrees and a spacing distance of 60 degrees, the third sensor 33 may be disposed to have an angular difference of 60 degrees with the first sensor 31, and the fourth sensor 34 may be disposed to have an angular difference of 60 degrees with the second sensor 32, as illustrated in FIG. 2B.

The first sensor 31, the second sensor 32, the third sensor 33 and the fourth sensor 34 may include sensing coils L1, L2, L3 and L4, respectively. The sensing coils L1, L2, L3 and L4 may be provided by forming a circuit pattern on a substrate. According to an example, the sensing coils L1, L2, L3 and L4 may be formed of one of a wound inductor coil and a solenoid coil. The first sensor 31, the second sensor 32, the third sensor 33 and the fourth sensor 34 including the sensing coils L1, L2, L3 and L4 may sense a rotation angle and a rotation direction of the rotating body, by inductance varying depending on the area of overlap with the first pattern portion 21 and the second pattern portion 22.

The rotation information calculation unit 40 may be implemented as an integrated circuit and may be electrically connected to the first sensor 31, the second sensor 32, the third sensor 33, and the fourth sensor 34. The rotation information calculation unit 40 may calculate rotation information including the rotation direction of the rotating body and the rotation angle of the rotating body, depending on a change in inductance of the first sensor 31, the second sensor 32, the third sensor 33 and the fourth sensor 34.

Referring to FIG. 1B, the rotation sensing apparatus according to the example of FIG. 1B may further include a support member 23 connected to the rotary shaft 11. The rotation sensing apparatus according to the example of FIG. 1B is similar to the rotation sensing apparatus according to the example of FIG. 1A, and thus, a duplicate description will be omitted and differences will mainly be described. The support member 23 is connected to the rotary shaft 11 to rotate around the rotary shaft 11 clockwise or counterclockwise by the rotation of the wheel 10. For example, the support member 23 may be formed to have a cylindrical shape. The detected part 20 may be disposed on the support member 23 having the cylindrical shape. The detected part 20 may include the first pattern portion 21 and the second pattern portion 22 disposed on a side surface of the support member 23 having a cylindrical shape.

The first pattern portion 21 may include a plurality of first patterns extending in the rotation direction in a first height region of the support member 23 formed to have a cylindrical shape, and a plurality of second patterns extending in the rotation direction in a second height region of the support member 23 formed to have the cylindrical shape. The plurality of first patterns of the first pattern portion 21 and the plurality of second patterns of the second pattern portion 22 may be formed of one of a metal and a magnetic material.

The support member 23 according to the example may be formed of a non-metallic material such as plastic, and the first pattern portion 21 and the second pattern portion 22 may be formed of a metal. The support member 23 may be formed using plastic through an injection molding process, and the first pattern portion 21 and the second pattern portion 22 may be formed through a plating process.

The first pattern portion 21 and the second pattern portion 22 may be disposed on a side surface of the support member 23. For example, when the first pattern portion 21 and the second pattern portion 22 are disposed on the support member 23, a groove in which the first pattern portion 21 and the second pattern portion 22 are to be provided are formed in the side surface of the support member 23 having a cylindrical shape. For example, the support member 23 may be provided with a step formed by the groove extending in the rotation direction. The first pattern portion 21 and the second pattern portion 22 may be disposed in the groove provided in the side surface of the support member 23 to be exposed externally. As an example, thicknesses of the first pattern portion 21 and the second pattern portion 22 may be respectively the same as a thickness of the groove.

In the case of the rotation sensing apparatus according to the example of FIG. 1B, a thin pattern is manufactured by an excellent mass production method such as an injection molding process and a plating process, which may be advantageous in terms of mass production and cost reduction.

Figure 3:
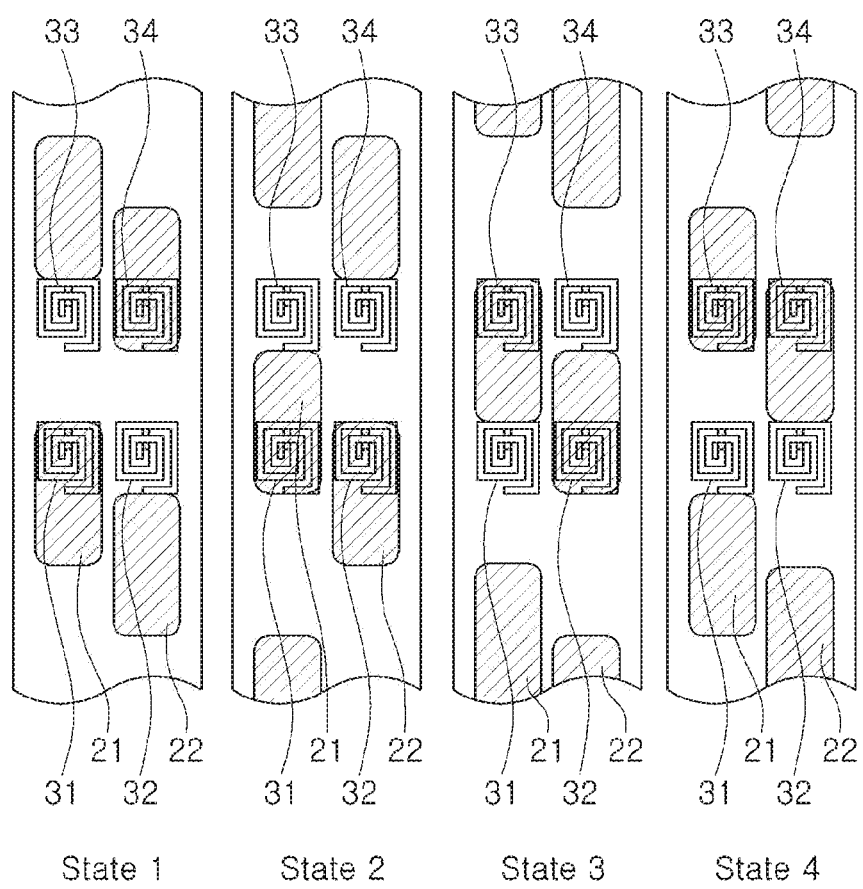
FIG. 3 is a view for illustrating a positional relationship between a detected part and a sensor unit, depending on a rotation of the detected part according to an example.
Figure 4:
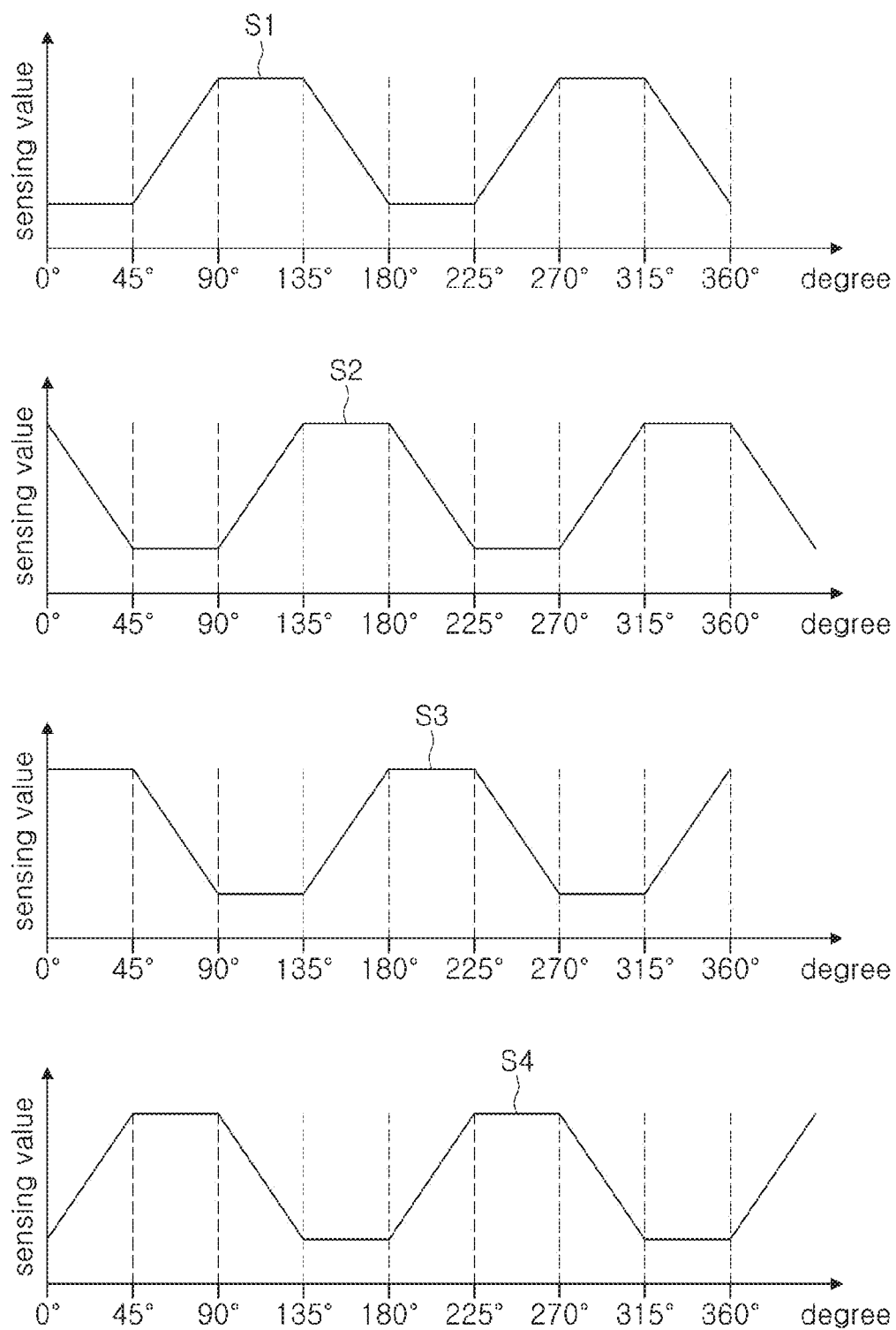
FIG. 4 provides graphs illustrating sensing values measured by a sensor unit depending on rotation of the detected unit according to an example.

FIG. 3 is a view illustrating a positional relationship between the detected part and the sensor unit, based on the rotation of the detected part according to an example. FIG. 4 is a graph illustrating a sensing value measured by the sensor unit depending on the rotation of the detected part. In FIG. 3, the first sensor 31 and the second sensor 32 are illustrated in the form of a sensing coil provided as an example of the first sensor 31 and the second sensor 32.

Referring to FIGS. 3 and 4, the area of overlap of the detected part 20 and the sensor unit 30 may be changed by the rotation of the wheel 10. In detail, the area of overlap between the first pattern portion 21 and the first sensor 31 and the third sensor 33 and the area of overlap between the second pattern portion 22 and the second sensor 32 and the fourth sensor 34 may be changed. A sensing value S1 of the first sensor 31 changes by a change in the area of overlap of the first pattern portion 21 and the first sensor 31. A sensing value S3 of the third sensor 33 changes by a change in the area of overlap of the first pattern portion 21 and the third sensor 33. A sensing value S2 of the second sensor 32 changes by a change in the area of overlap of the second pattern portion 22 and the second sensor 32. A sensing value S4 of the fourth sensor 34 changes by a change in the area of overlap of the second pattern portion 22 and the fourth sensor 34. The sensing values of the first to fourth sensors may correspond to inductance.

Hereinafter, for the sake of convenience, the change in the sensing value S1 of the first sensor 31 according to the change in the area of overlap of the first pattern portion 21 and the first sensor 31 will mainly be described. However, the following description may be applied to the change of sensing values of the remaining sensors.

In FIG. 3, a case in which the first pattern portion 21 and the second pattern portion 22 are rotated in a direction from the lower side to the upper side is described as an example. In State 1, the first sensor 31 overlaps the first pattern portion 21. For example, when the first pattern portion 21 formed of a metal material is adjacent to the first sensor 31 constituted by a sensing coil, a current is applied to the first pattern portion 21 by a magnetic flux generated in the sensing coil, and a magnetic flux is generated in the first pattern portion 21 by the current applied to the first pattern portion 21. At this time, the magnetic flux generated in the first pattern portion 21 cancels the magnetic flux of the sensing coil of the first sensor 31, and the inductance of the sensing coil of the first sensor 31 decreases. Therefore, referring to 0 degree in FIG. 4, corresponding to State 1, the sensing value S1 of the first sensor 31 corresponds to a low level.

After the State 1, the first pattern portion 21 rotates in a direction from a lower part to an upper part, and in State 2, the first sensor 31 is still maintained to be in the state of overlapping the first pattern portion 21. Thus, referring to 45 degrees in FIG. 4 corresponding to the State 2, the sensing value S1 of the first sensor 31 is maintained at a low level.

After the State 2, the first pattern portion 21 rotates in a direction from the lower side from the upper side, and in State 3, the first sensor 31 does not overlap the first pattern portion 21. Therefore, referring to 90 degrees of FIG. 4 corresponding to the State 3, the sensing value S1 of the first sensor 31 is changed to a high level.

After the State 3, the first pattern portion 21 rotates upwardly from the lower side, and in State 4, the first sensor 31 still does not overlap the first pattern portion 21. Therefore, referring to 180 degrees of FIG. 4 corresponding to the State 4, the sensing value S1 of the first sensor 31 maintains the high level.

Figure 5A:
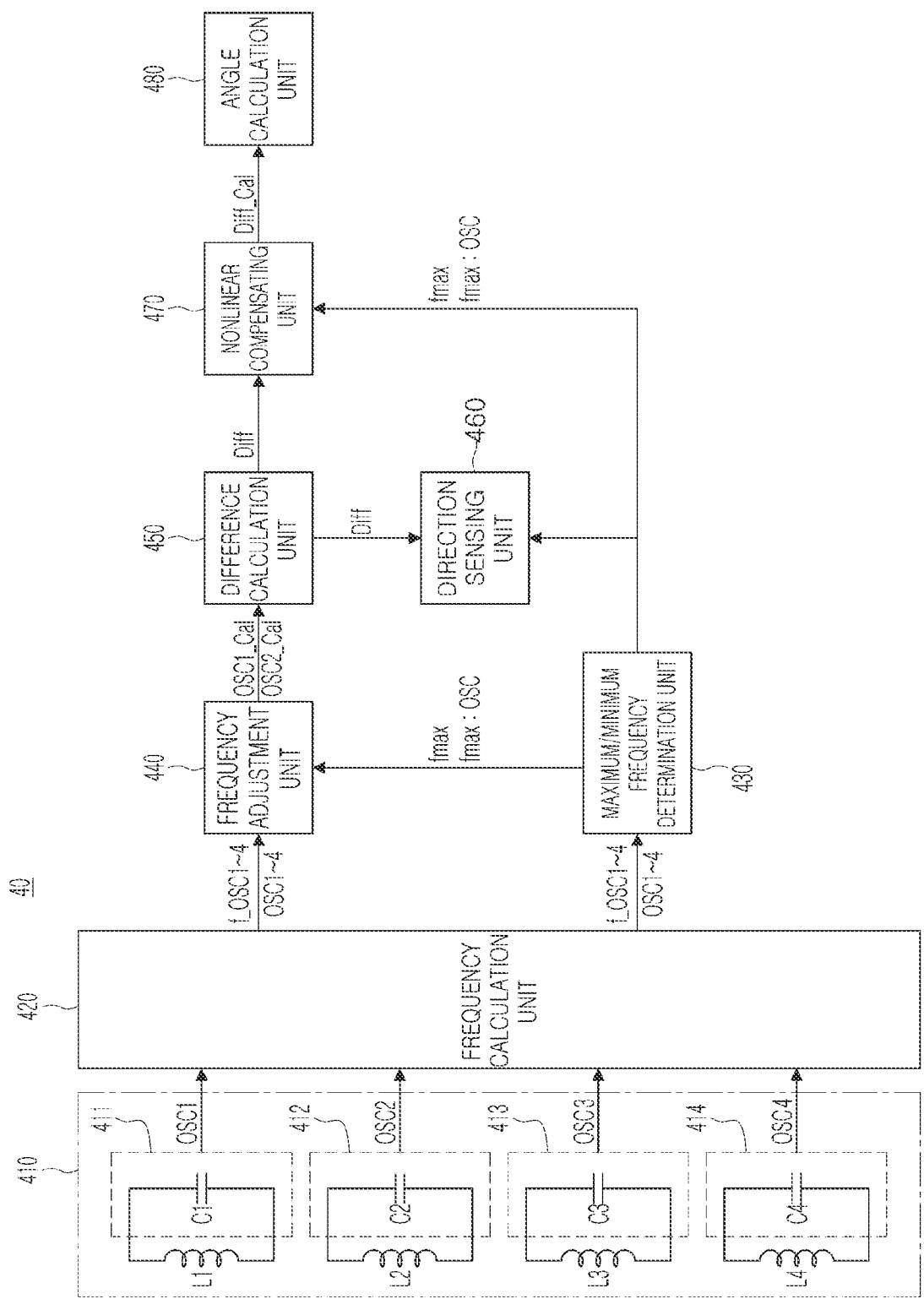
FIG. 5A is a block diagram of a rotation information calculation unit according to an example.

FIG. 5A is a block diagram of a rotation information calculation unit according to an example. 5B is a block diagram of a rotation information calculation unit according to another example.

Referring to FIG. 5A, a method of detecting a rotating body of a rotation sensing apparatus according to an example will be described in detail.

A rotation information calculation unit 40 according to an example may include an oscillation unit 410, a frequency calculation unit 420, a maximum/minimum frequency determination unit 430, a frequency adjustment unit 440, a difference calculation unit 450, a direction sensing unit 460, a nonlinear compensating unit 470, and an angle calculation unit 480.

The oscillation unit 410 may include a plurality of oscillation signal generators. The plurality of oscillation signal generators may include a first oscillation signal generator 411, a second oscillation signal generator 412, a third oscillation signal generator 413, and a fourth oscillation signal generator 414.

The first oscillation signal generator 411 includes a first sensing coil L1 of the first sensor 31 and a first capacitor C1 forming a first oscillation circuit, and the second oscillation signal generator 412 includes a second sensing coil L2 of the second sensor 32 and a second capacitor C2 forming a second oscillation circuit. In addition, the third oscillation signal generator 413 includes a third sensing coil L3 of the third sensor 33 and a third capacitor C3 forming a third oscillation circuit, and the fourth oscillation signal generator 414 includes a fourth sensing coil L4 of the fourth sensor 34 and a fourth capacitor C4 forming a fourth oscillation circuit.

One pair of sensing coils and capacitors may constitute a predetermined LC oscillator. A plurality of oscillation circuits included in the oscillation unit 410 are schematically illustrated, and the first to fourth oscillation circuits may be configured in various forms of oscillators known in the art. The first oscillation signal generator 411 outputs a first oscillation signal OSC1, the second oscillation signal generator 412 outputs a second oscillation signal OSC2, the third oscillation signal generator 413 outputs a third oscillation signal OSC3, and the fourth oscillation signal generator 414 outputs a fourth oscillation signal OSC4. For example, when the overlapped area of the detected part 20 with the first sensing coil L1, the second sensing coil L2, the third sensing coil L3 and the fourth sensing coil L4 is changed by rotation of the wheel 10, frequency of the oscillation signal output from the first oscillation signal generator 411, the second oscillation signal generator 412, the third oscillation signal generator 413 and the fourth oscillation signal generator 414 is changed. In the above description, although the first sensor 31, the second sensor 32, the third sensor 33 and the fourth sensor 34 respectively form an oscillation circuit and a capacitor to output an oscillation signal, the oscillation signal may correspond to an example of a sensing signal output from the first sensor 31, the second sensor 32, the third sensor 33 and the fourth sensor 34. Thus, the first sensor 31, the second sensor 32, the third sensor 33, and the fourth sensor 34 may be combined with various devices to generate various sensing signals. For convenience of explanation, a case in which the first sensor 31, the second sensor 32, the third sensor 33, and the fourth sensor 34 respectively form a capacitor and an oscillation circuit to output an oscillation signal will be described as an example.

The frequency calculation unit 420 calculates frequencies of the first oscillation signal OSC1, the second oscillation signal OSC2, the third oscillation signal OSC3 and the fourth oscillation signal OSC4 provided from the oscillation unit 410. The frequency calculation unit 420 counts the frequencies of the first oscillation signal OSC1, the second oscillation signal OSC2, the third oscillation signal OSC3 and the fourth oscillation signal OSC4, to calculate a frequency f_OSC1 of the first oscillation signal OSC1, a frequency f_OSC2 of the second oscillation signal OSC2, a frequency f_OSC3 of the third oscillation signal OSC3 and a frequency f_OSC4 of the fourth oscillation signal OSC4.

The frequency calculation unit 420 may provide the frequency f_OSC1 of the first oscillation signal OSC1, the frequency f_OSC2 of the second oscillation signal OSC2, the frequency f_OSC3 of the third oscillation signal OSC3, and the frequency f_OSC4 of the fourth oscillator OSC4, together with the first oscillation signal OSC1, the second oscillation signal OSC2, the third oscillation signal OSC3 and the fourth oscillation signal OSC4, to respective configurations as well as to the maximum/minimum frequency determination unit 430 and the frequency adjustment unit 440.

The maximum/minimum frequency determination unit 430 receives the frequency f_OSC1 of the first oscillation signal OSC1, the frequency f_OSC2 of the second oscillation signal OSC2, the frequency f_OSC3 of the third oscillation signal OSC3, and the frequency f_OSC4 of the fourth oscillation signal OSC4 provided from the frequency calculation unit 420, to determine one of a maximum frequency fmax and a minimum frequency fmin for each time period. The maximum/minimum frequency determination unit 430 may determine an oscillation signal fmax:OSC corresponding to one of the maximum frequency fmax and the minimum frequency fmin.

The maximum/minimum frequency determination unit 430 receives the first oscillation signal OSC1, the second oscillation signal OSC2, the third oscillation signal OSC3, and the fourth oscillation signal OSC4, which are generated in real time, and information regarding frequencies thereof. The maximum/minimum frequency determination unit 430 may determine the maximum frequency fmax and the minimum frequency fmin for each timing or each time period, using the received oscillation signals and the frequency information thereof.

Hereinafter, for convenience of explanation, the operation of the rotation information calculation unit will be described mainly with the maximum frequency fmax. The following description may also be applied to the minimum frequency fmin.

Figure 6:
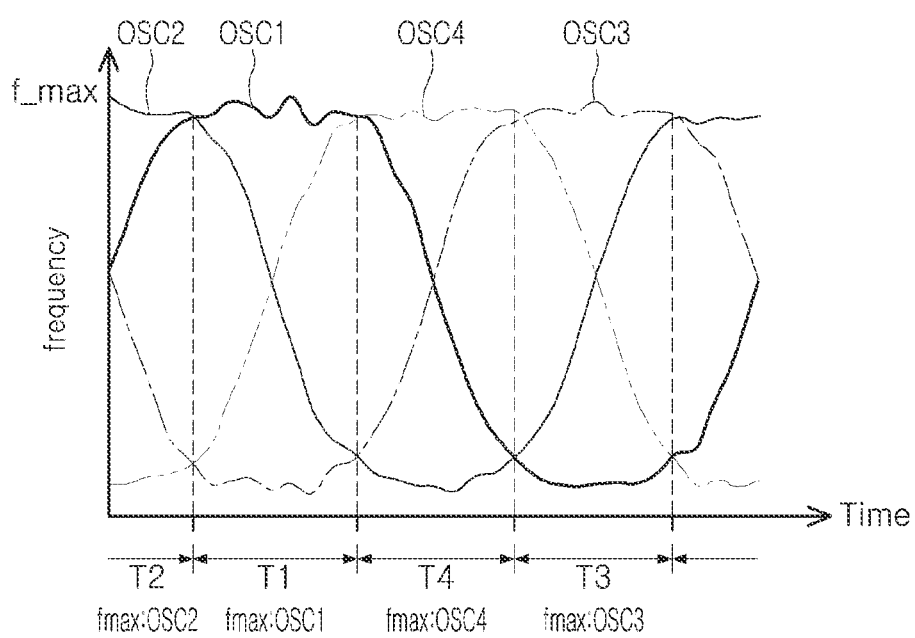
FIG. 6 is a simulation graph of a first oscillation signal, a second oscillation signal, a third oscillation signal, and a fourth oscillation signal according to an example.

FIG. 6 is a simulation graph of a first oscillation signal, a second oscillation signal, a third oscillation signal, and a fourth oscillation signal according to an example.

When the first oscillation signal OSC1, the second oscillation signal OSC2, the third oscillation signal OSC3 and the fourth oscillation signal OSC4 having frequencies illustrated in FIG. 6 are provided, the maximum/minimum frequency determination unit 430 calculates the maximum frequency fmax for each time period.

Also, the maximum/minimum frequency determination unit 430 may determine an oscillation signal corresponding to the calculated maximum frequency. As an example, the maximum/minimum frequency determination unit 430 determines the first oscillation signal OSC1 as an oscillation signal fmax:OSC1 corresponding to a maximum frequency in a first interval T1, determines the second oscillation signal OSC2 as an oscillation signal fmax:OSC2 corresponding to a maximum frequency in a second interval T2, determines the third oscillation signal OSC3 as an oscillation signal fmax:OSC3 corresponding to a maximum frequency in a third interval T3, and determines the fourth oscillation signal OSC4 as an oscillation signal fmax:OSC4 corresponding to a maximum frequency in a fourth interval T4.

Figure 7:
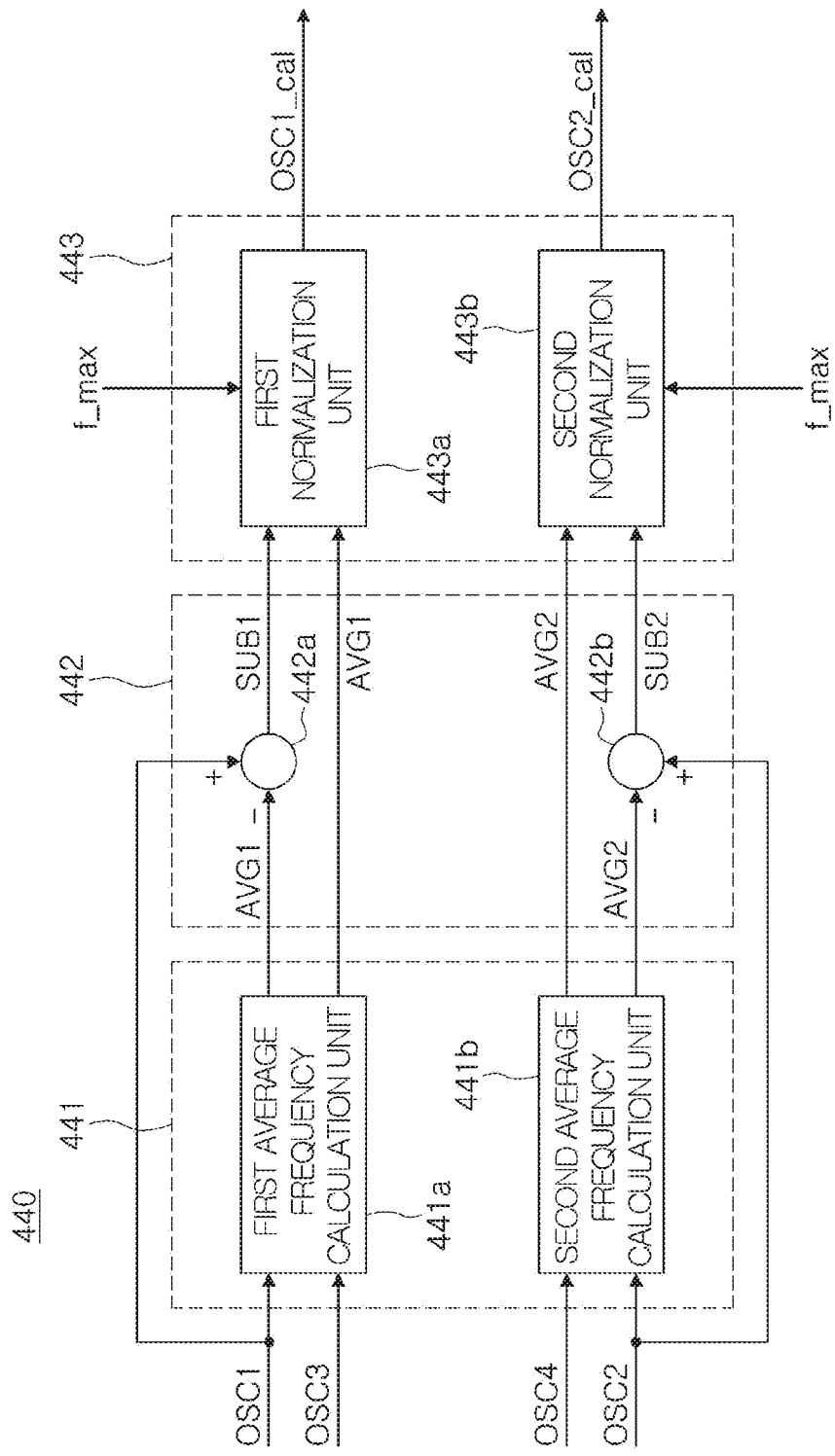
FIG. 7 is a block diagram of a frequency adjustment unit according to an example.
Figure 8A:
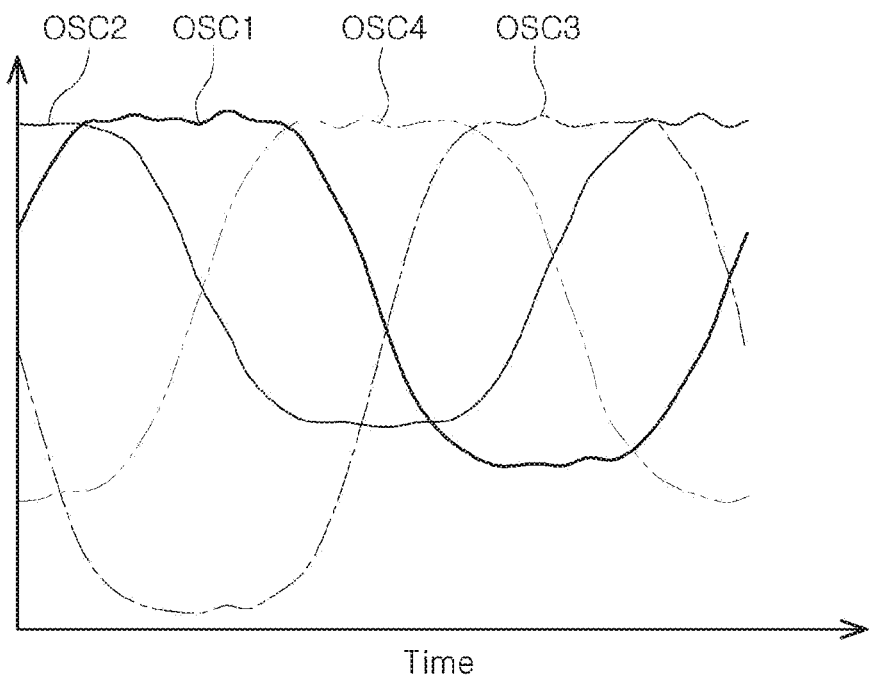
FIG. 8A is a simulation graph of an oscillation signal when a detected part deviates from a neutral position according to an example.
Figure 8B:
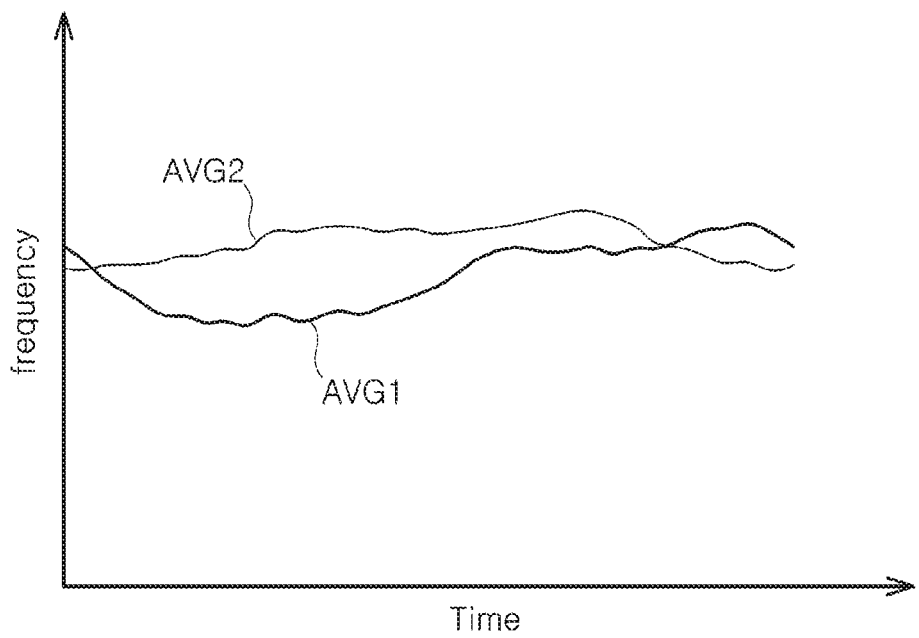
FIG. 8B is a simulation graph of an average signal according to an example.
Figure 8C:
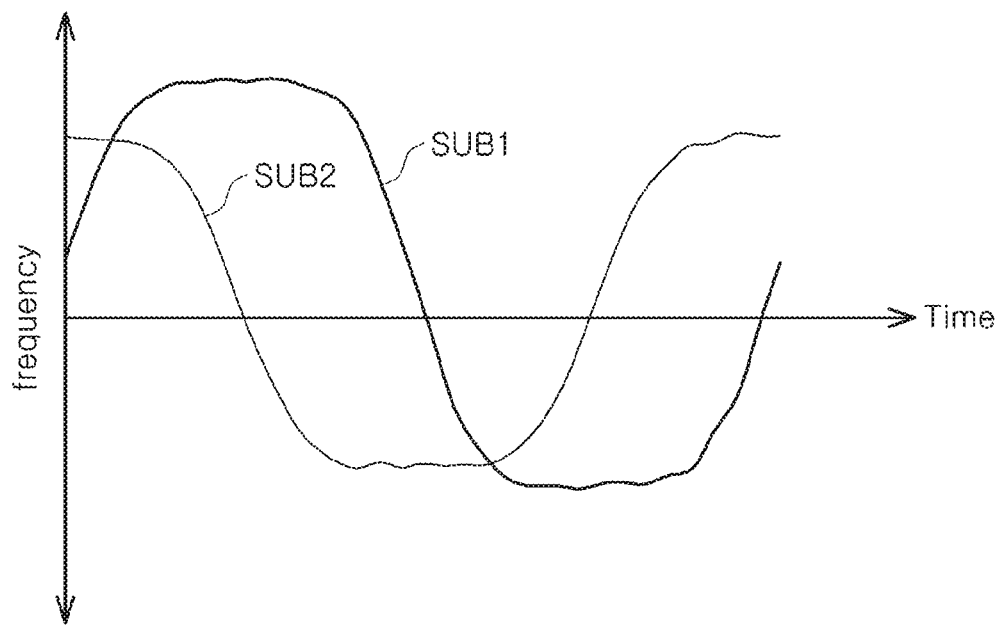
FIG. 8C is a simulation graph of a subtraction signal according to an example.
Figure 8D:
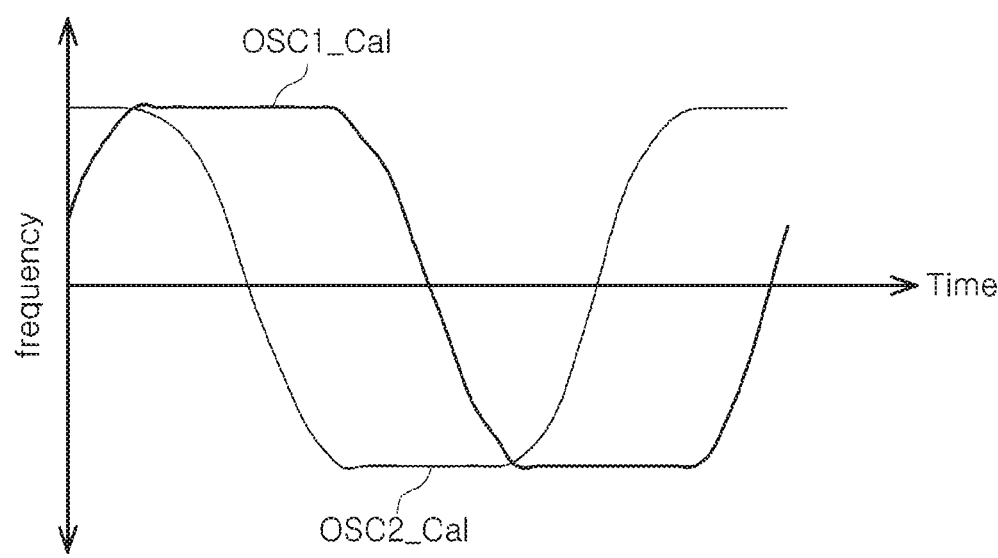
FIG. 8D is a simulation graph of an adjustment signal according to an example.

FIG. 7 is a block diagram of a frequency adjustment unit according to an example. FIG. 8A is a simulation graph of an oscillation signal when the detected part deviates from a neutral position according to an example, FIG. 8B is a simulation graph of an average signal according to an example, FIG. 8C is a simulation graph of a subtraction signal according to an example, and FIG. 8D is a simulation graph of an adjustment signal according to an example.

For example, in a case in which a user operates the wheel, the detected part may deviate from a horizontal or vertical neutral position by the force in an unintended direction, different from the force in the rotation direction. Referring to FIG. 8A, in the case in which the detected part deviates from the horizontal or vertical neutral position, frequencies of the first oscillation signal OSC1, the second oscillation signal OSC2, the third oscillation signal OSC3 and the fourth oscillation signal OSC4 may vary unevenly, and sensing sensitivity of the rotation sensing apparatus may be deteriorated. Therefore, in the case in which the detected part deviates from the horizontal or vertical neutral position, it is necessary to compensate for the decreased sensing sensitivity of the rotation sensing apparatus.

The frequency adjustment unit 440 according to an example may generate a first adjustment signal OSC1_cal and a second adjustment signal OSC2_cal in response to the first oscillation signal OSC1, the second oscillation signal OSC2, the third oscillation signal OSC3 and the fourth oscillation signal OSC4, and may calculate rotation information in response to the generated first adjustment signal OSC1_cal and second adjustment signal OSC2_cal, thereby improving sensing sensitivity.

The frequency adjustment unit 440 according to an example may include an average signal generator 441, a subtractor 442, and a normal signal generator 443.

The average signal generator 441 may include a first average frequency calculation unit 441a, and a second average frequency calculation unit 441b. Referring to FIG. 8B, the first average frequency calculation unit 441a may average the first oscillation signal OSC1 and the second oscillation signal OSC2 according to the frequency f_OSC1 of the first oscillation signal OSC1 and the frequency f_OSC3 of the third oscillation signal OSC3, to generate a first average signal AVG1. The second average frequency calculation unit 441b may average the second oscillation signal OSC2 and the fourth oscillation signal OSC4 according to the frequency f_OSC2 of the second oscillation signal OSC2 and the frequency f_OSC4 of the fourth oscillation signal OSC4, to generate a second average signal AVG2. The first average signal AVG1 and the second average signal AVG2 illustrated in FIG. 8B may be generated by the average signal generator 441.

The subtractor 442 may include a first subtractor 442a and a second subtractor 442b.

The first subtractor 442a subtracts the first average signal AVG1 from the first oscillation signal OSC1 to generate a first subtraction signal SUB1. As an example, the first subtraction signal SUB1 may be generated by subtracting a frequency f_AVG1 of the first average signal AVG1 from the frequency f_OSC1 of the first oscillation signal OSC1.

The second subtractor 442b subtracts the second average signal AVG2 from the second oscillation signal OSC2 to generate a second subtraction signal SUB2. For example, the second subtraction signal SUB2 may be generated by subtracting a frequency f_AVG2 of the second average signal AVG2 from the frequency f_OSC2 of the second oscillation signal OSC2. The subtractor 442 may generate the first subtraction signal SUB1 and the second subtraction signal SUB2 illustrated in FIG. 8C.

According to an example, the first subtractor 442a subtracts the first average signal AVG1 from the third oscillation signal OSC3, and the second subtractor 442b subtracts the second average signal AVG2 from the fourth oscillation signal OSC4. For convenience of explanation, a case, in which the first subtractor 442a subtracts the first average signal AVG1 from the first oscillation signal OSC1, and the second subtractor 442b subtracts the second average value AVG2 from the second oscillation signal OSC2, will be described as an example.

The normal signal generator 443 may include a first normalization unit 443a and a second normalization unit 443b.

The first normalization unit 443a normalizes the first subtraction signal SUB1 to generate the first adjustment signal OSC1_cal. The first normalization unit 443a may normalize the first subtraction signal SUB1 by the first average signal AVG1 and the maximum frequency fmax. As an example, the first normalization unit 443a calculates the frequency f_OSC1_cal of the first adjustment signal OSC1_cal, by a ratio of frequency f_SUB1 of the first subtraction signal SUB1 with respect to a difference between the maximum frequency fmax and the frequency f_AVG1 of the first average signal AVG1, based on the following equation 1, to generate the first adjustment signal OSC1_cal.

$$f\_OSC1\_cal = \frac{f\_SUB1}{f\_MAX - f\_AVG1} \qquad \text{Equation 1}$$

The second normalization unit 443b normalizes the second subtraction signal SUB2 to generate the second adjustment signal OSC2_cal. The second normalization unit 443b may normalize the second subtraction signal SUB2 according to the second average signal AVG2 and the maximum frequency fmax. For example, the second normalization unit 443b may calculate the frequency f_OSC2_cal of the second adjustment signal OSC2_cal, by a ratio of frequency f_SUB2 of the second subtraction signal SUB2 with respect to a difference between the maximum frequency fmax and the frequency f_AVG2 of the second average signal AVG2, based on the following equation 2, to generate the second adjustment signal OSC2_cal.

$$f\_OSC2\_cal = \frac{f\_SUB2}{f\_MAX - f\_AVG2} \qquad \text{Equation 2}$$

The first adjustment signal OSC1_cal and the second adjustment signal OSC2_cal illustrated in FIG. 8D may be generated by the normal signal generator 443.

Comparing FIGS. 8A and 8D, the first oscillation signal OSC1 and the second oscillation signal OSC2 have a non-uniform frequency by the detected part deviating from the neutral position, while the first adjustment signal OSC1_cal and the second adjustment signal OSC2_cal have a uniform frequency range. Therefore, the rotation sensing apparatus according to an example may accurately calculate the rotation information of the rotating body even in the case in which the detected part deviates from the neutral position.

Referring again to FIG. 5A, the difference calculation unit 450 may calculate a differential signal Diff by calculating a difference between the first adjustment signal OSC1_cal and the second adjustment signal OSC2_cal.

Figure 9:
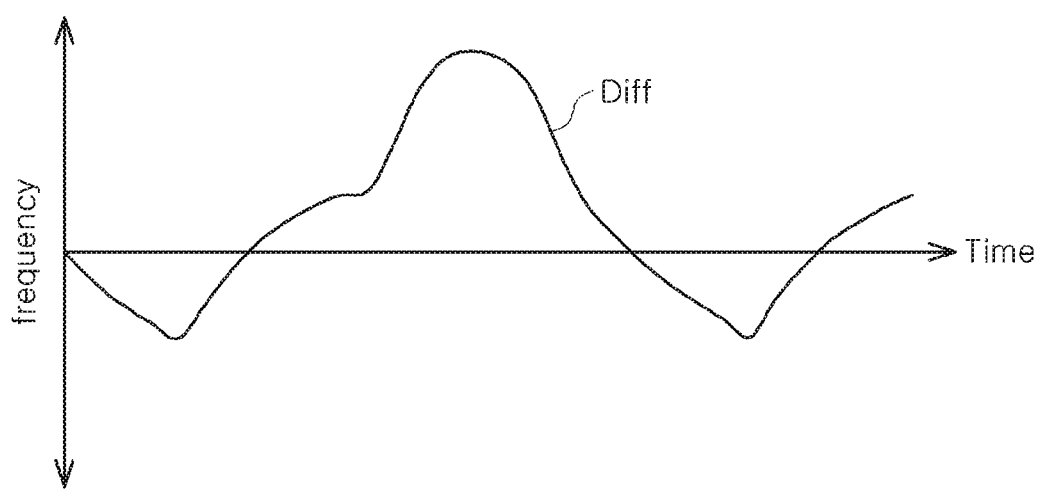
FIG. 9 is a simulation graph of a differential signal according to an example.

FIG. 9 is a simulation graph of a differential signal according to an example.

Referring to FIG. 9, the difference calculation unit 450 may generate a differential signal Diff, increased or decreased according to a time period, by subtracting the first adjustment signal OSC1_cal and the second adjustment signal OSC2_cal.

Figure 5B:
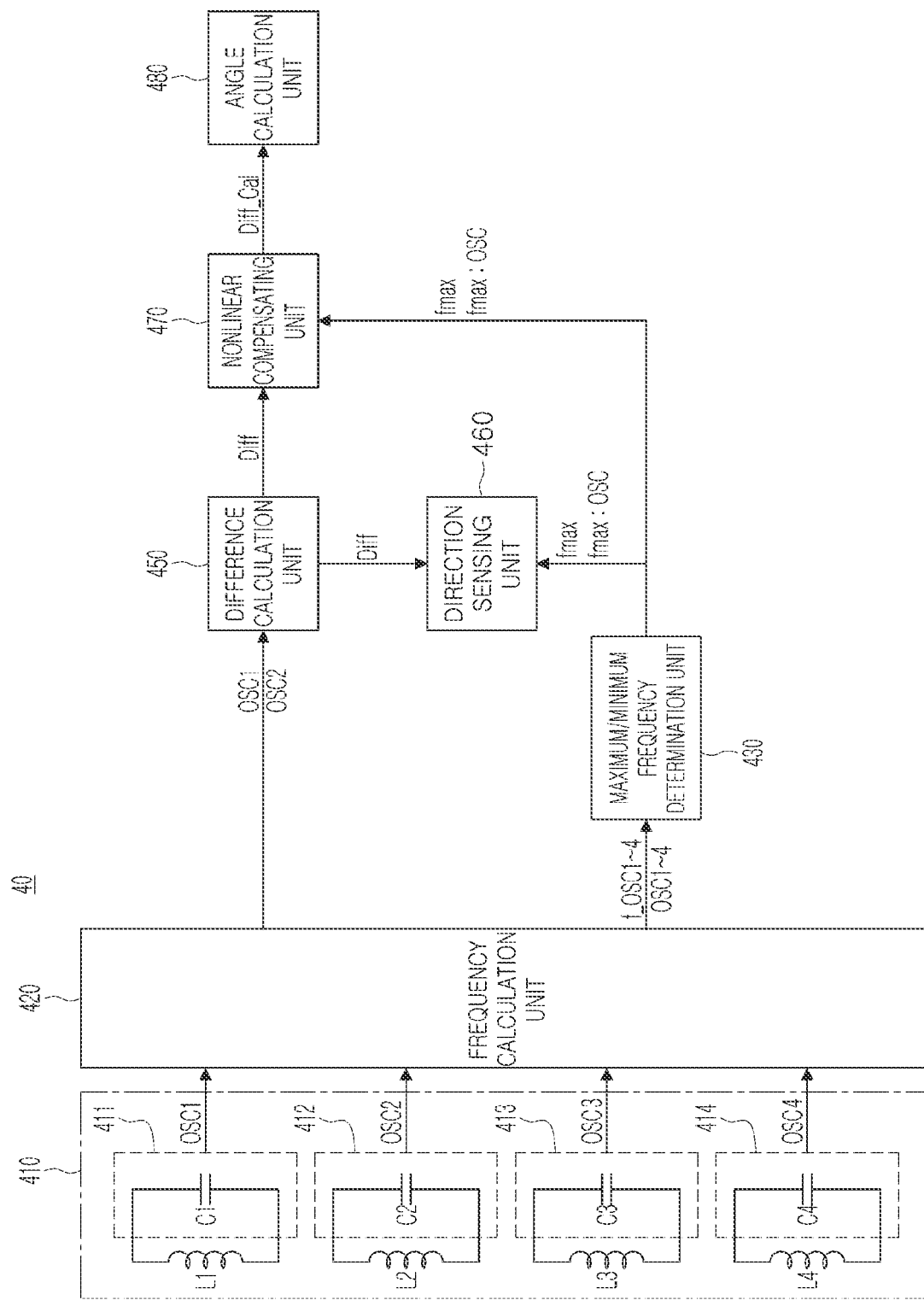
FIG. 5B is a block diagram of a rotation information calculation unit according to another example.

On the other hand, referring to FIG. 5B, the frequency adjustment unit 440 of the rotation information calculation unit 40 according to the example of FIG. 5A may be omitted. In the case in which the frequency adjustment unit 440 is omitted, the first oscillation signal OSC1 and the second oscillation signal OSC2 are provided to the difference calculation unit 450, instead of the first adjustment signal OSC1_cal and the second adjustment signal OSC2_cal, and thus, the differential signal Diff may be generated by the difference between the first oscillation signal OSC1 and the second oscillation signal OSC2.

Figure 10A:
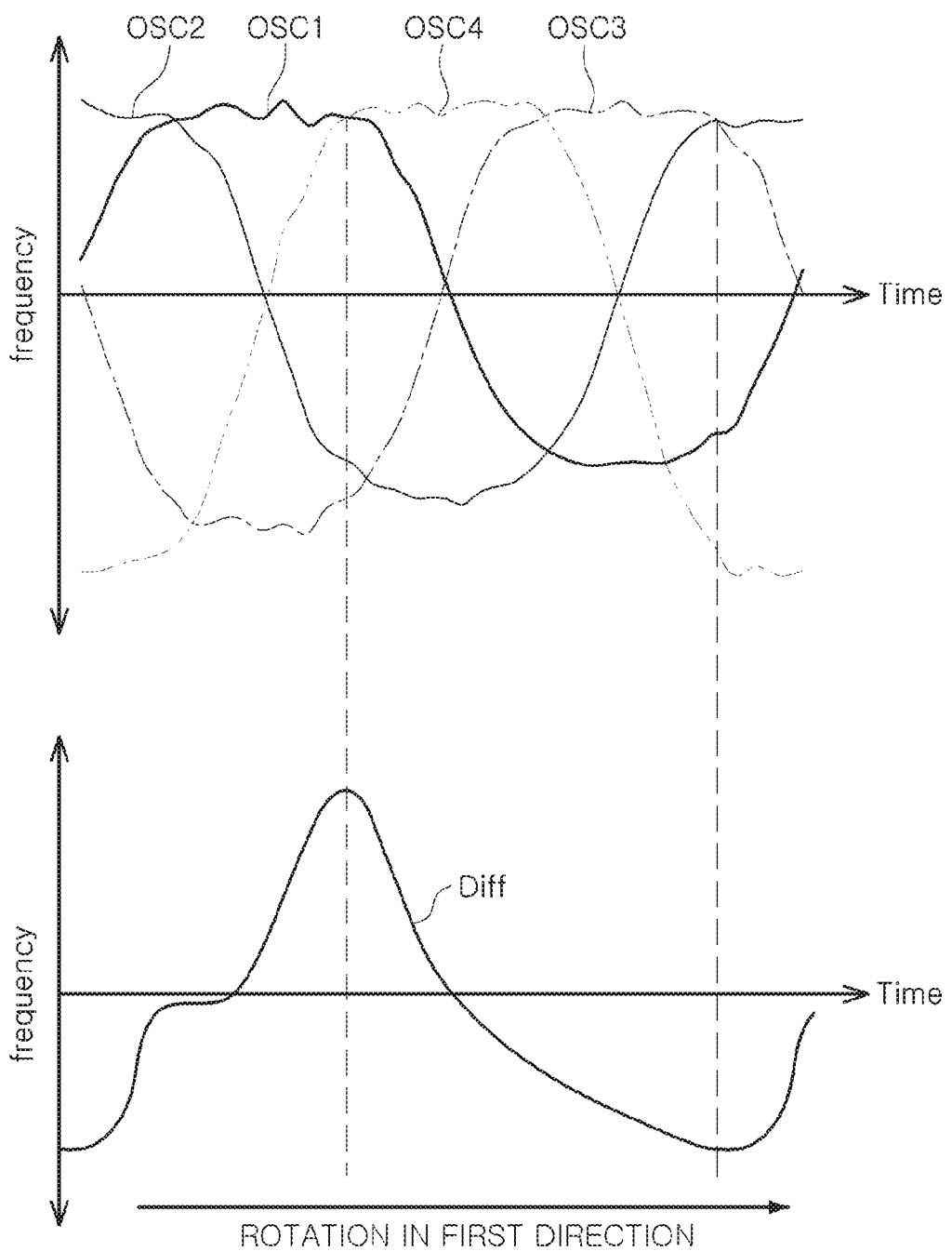
FIG. 10A provides simulation graphs of a first oscillation signal, a second oscillation signal, a third oscillation signal, a fourth oscillation signal, and a differential signal when a rotating body rotates in a first direction, according to an example.
Figure 10B:
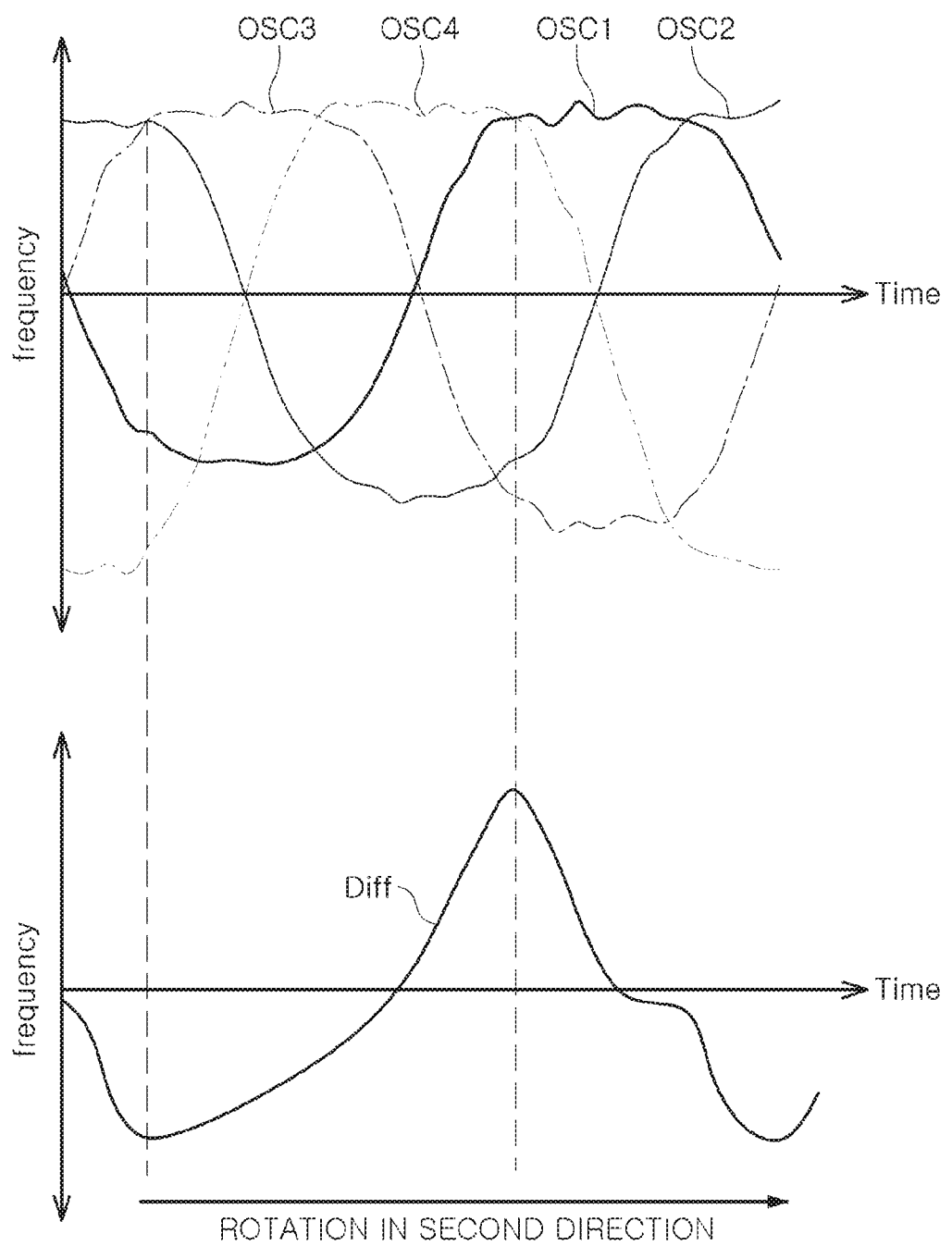
FIG. 10B provides simulation graphs of a first oscillation signal, a second oscillation signal, a third oscillation signal, a fourth oscillation signal, and a differential signal when a rotating body rotates in a second direction, according to an example.

FIG. 10A is a simulation graph illustrating a first oscillation signal OSC1, a second oscillation signal OSC2, a third oscillation signal OSC3, a fourth oscillation signal OSC4, and a differential signal Diff, when the rotating body rotates in a first direction, according to an example. FIG. 10B is a simulation graph illustrating a first oscillation signal OSC1, a second oscillation signal OSC2, a third oscillation signal OSC3, a fourth oscillation signal OSC4 and a differential signal Diff when the rotating body rotates in a second direction, according to an example.

The direction sensing unit 460 may sense a rotation direction of the rotating body according to the interval of the oscillation signal corresponding to the maximum frequency and the increasing or decreasing differential signal Diff.

Referring to FIG. 10A, when the rotating body rotates in the first direction, and in a case in which the first oscillation signal OSC1 or the second oscillation signal OSC2 has a maximum frequency, the differential signal Diff increases. Further, when the rotating body rotates in the first direction and the third oscillation signal OSC3 or the fourth oscillation signal OSC4 has a maximum frequency, the differential signal Diff decreases.

When the rotating body rotates in the second direction different from the first direction and the first oscillation signal OSC1 or the second oscillation signal OSC2 has a maximum frequency, the differential signal Diff decreases. Further, when the rotating body rotates in the second direction and the third oscillation signal OSC3 or the fourth oscillation signal OSC4 has a maximum frequency, the differential signal Diff increases.

Therefore, for example, when the first oscillation signal OSC1 or the second oscillation signal OSC2 corresponds to the maximum frequency and the differential signal Diff increases, the direction sensing unit 460 determines that the rotating body rotates in the first direction. When the third oscillation signal OSC3 or the fourth oscillation signal OSC4 corresponds to the maximum frequency and the differential signal Diff decreases, the direction sensing unit 460 determines that the rotating body rotates in the first direction.

Alternatively, when the first oscillation signal OSC1 or the second oscillation signal OSC2 corresponds to the maximum frequency and the differential signal Diff decreases, the direction sensing unit 460 determines that the rotating body rotates in the second direction different from the first direction. When the third oscillation signal OSC3 or the fourth oscillation signal OSC4 corresponds to the maximum frequency and the differential signal Diff increases, the direction sensing unit 460 determines that the rotating body rotates in the second direction.

The nonlinear compensating unit 470 may compensate for nonlinearity of the differential signal Diff in response to the oscillation signal having a maximum frequency.

When the first oscillation signal OSC1 or the second oscillation signal OSC2 has a maximum frequency, the differential signal Diff has a first nonlinearity. Referring to FIG. 10A, when the first oscillation signal OSC1 or the second oscillation signal OSC2 has a maximum frequency, the differential signal Diff has the first nonlinearity that substantially increases in a stepwise manner. Referring to FIG. 10B, when the first oscillation signal OSC1 or the second oscillation signal OSC2 has a maximum frequency, the differential signal Diff has a first nonlinearity that decreases substantially in a stepwise manner.

On the other hand, when the third oscillation signal OSC3 or the fourth oscillation signal OSC4 has a maximum frequency, the differential signal Diff has a second nonlinearity. Referring to FIG. 10A, when the third oscillation signal OSC3 or the fourth oscillation signal OSC4 has a maximum frequency, the differential signal Diff has a second nonlinearity that substantially decreases exponentially. Referring to FIG. 10B, when the third oscillation signal OSC3 or the fourth oscillation signal OSC4 has a maximum frequency, the differential signal Diff has a second nonlinearity that substantially increases exponentially. The first nonlinearity and the second nonlinearity are caused by a process error of an angle, a position, and a size of a sensor provided in the sensor unit 30 and a pattern portion provided in the detected part 20, and by a process error due to a tilt of the rotary shaft. In this case, the process error may be understood as a difference between a design value and an actual measurement value. Even in a case in which a compensation algorithm and a compensation parameter for compensating for the first nonlinearity and the second nonlinearity are obtained by grasping the first nonlinearity and the second nonlinearity of the differential signal Diff in advance, it is required to determine whether the differential signal has any nonlinearity among the first nonlinearity and the second nonlinearity in increase and decrease intervals to apply the compensation algorithm and the compensation parameter.

The nonlinear compensating unit 470 according to an example may determine the nonlinearity of the differential signal Diff by an oscillation signal having a maximum frequency.

The nonlinear compensating unit 470 determines that the differential signal Diff has the first nonlinearity in the case in which the first oscillation signal OSC1 or the second oscillation signal OSC2 has the maximum frequency, and may apply a first compensation algorithm, compensating for the first nonlinearity, to the differential signal Diff.

When the third oscillation signal OSC3 or the fourth oscillation signal OSC4 has the maximum frequency, the nonlinear compensating unit 470 determines that the differential signal Diff has the second nonlinearity, and may apply a second compensation algorithm, compensating for the second nonlinearity, to the differential signal Diff.

Figure 11A:
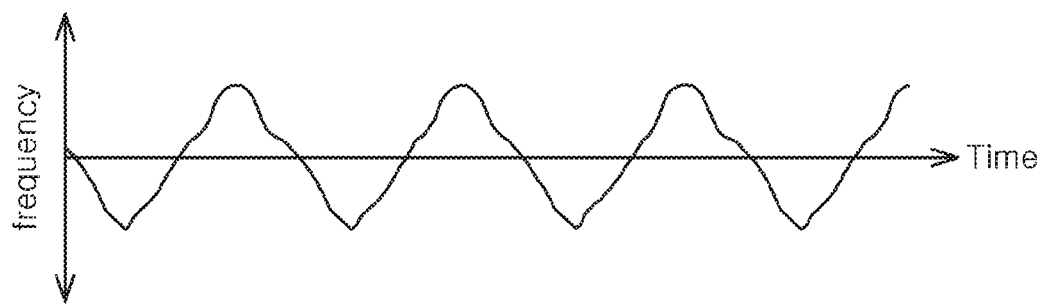
FIGS. 11A and 11B are simulation graphs of a differential signal before and after applying a compensation algorithm according to an example.
Figure 11B:
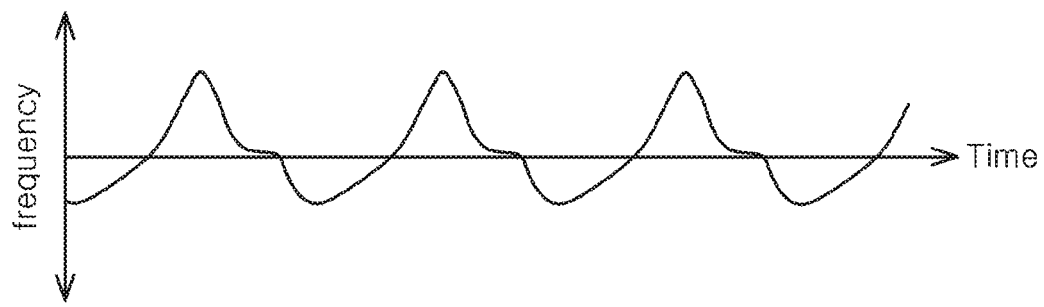

FIGS. 11A and 11B are simulation graphs of a differential signal before and after applying the compensation algorithm, according to an example.

FIG. 11A is a simulation graph of a differential signal after applying the compensation algorithm, and FIG. 11B is a simulation graph of a differential signal before applying the compensation algorithm.

Referring to FIGS. 11A and 11B, compared with a differential signal of FIG. 11B having the first nonlinearity that decreases substantially stepwise and the second nonlinearity that increases substantially exponentially, a differential signal of FIG. 11A shows that the nonlinearity is alleviated and linearly increases or decreases over time.

Figure 12:
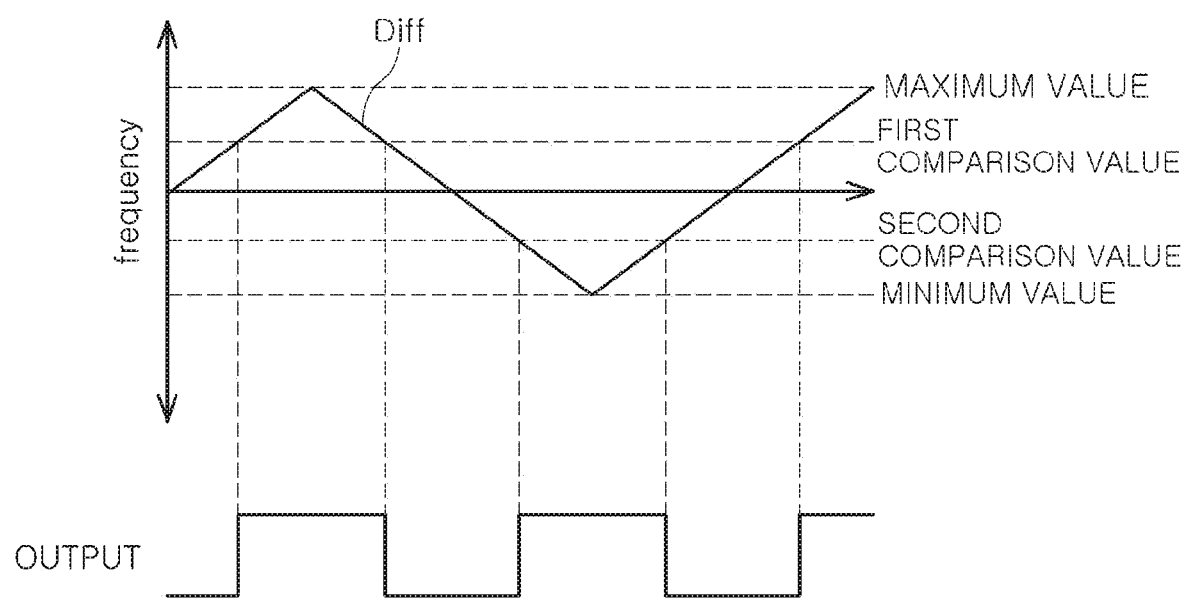
FIG. 12 is a diagram illustrating an angle calculating operation of an angle calculation unit according to an example.

FIG. 12 is a diagram provided to illustrate an angle calculating operation of the angle calculation unit according to an example.

Referring to FIGS. 5A and 12, the angle calculation unit 480 calculates a target sensing angle and a plurality of comparison values according to the size of the first pattern and the second pattern, and may calculate a rotation angle by comparing the plurality of calculated comparison values with the differential signal.

According to an example, even when the target sensing angle is changed or the size of the sensing coil/pattern is changed, a plurality of comparison values is calculated according to the determined target sensing angle and the size of the sensing coil/pattern, and the target sensing angle may be precisely detected by comparing the differential signal with the calculated comparison value.

The plurality of comparison values may be provided within a range between a maximum value Max and a minimum value Min of the differential signal Diff. On the other hand, differences between adjacent comparison values from among the plurality of comparison values are all the same as each other; a difference between a maximum comparison value among the plurality of comparison values and the maximum value Max of the differential signal Diff may correspond to twice the difference between adjacent comparison values among the plurality of comparison values; and a difference between a minimum comparison value among the plurality of comparison values and the minimum value Min of the differential signal Diff may correspond to twice the difference between adjacent comparison values among the plurality of comparison values.

Referring to FIG. 12, although two comparison values are provided, the two comparison values are illustrative, and the number of comparison values may be determined by the target sensing angle and the size of the pattern.

The plurality of comparison values may be determined depending on the target sensing angle and the size of the first pattern and the second pattern. The number of the plurality of comparison values may be determined by the ratio of the angle corresponding to the sizes of the first pattern and the second pattern and the target sensing angle, and levels of the plurality of comparison values may be determined to divide the angle corresponding to the sizes of the first pattern and the second pattern by the target sensing angle.

When the size of the pattern corresponds to 90 degrees, and the target sensing angle is 7.5 degrees, 12(=90/7.5)-number comparison values may be calculated. By the twelve comparison values, 90 degrees corresponding to the pattern size may be evenly divided by 7.5 degrees corresponding to the target sensing angle.

In addition, when the pattern size corresponds to 45 degrees and the target sensing angle is 7.5 degrees, 6(=45/7.5)-number comparison values may be calculated. By the six comparison values, 45 degrees corresponding to the pattern size may be evenly divided by 7.5 degrees corresponding to the target sensing angle.

In addition, when the pattern size corresponds to 15 degrees and the target sensing angle is 7.5 degrees, 2(=15/7.5)-number comparison values may be calculated. By the two comparison values, 15 degrees, corresponding to the pattern size, may be evenly divided by 7.5 degrees, corresponding to the target sensing angle.

The angle calculation unit 480 may generate an output value OUTPUT by comparing the differential signal Diff and the plurality of comparison values. The angle calculation unit 480 may calculate the output value OUTPUT by switching the state of the output value OUTPUT at the time that the level of the differential signal Diff is equal to the level of each of the first comparison value and the second comparison value.

In the case in which two comparison values, a first comparison value and a second comparison value, are provided from the angle calculation unit 480 and in which the output value OUTPUT has a low level before comparison with the first comparison value, the angle calculation unit 480 determines the differential signal Diff equal to or greater than the first comparison value to be the high level, the differential signal Diff less than the second comparison value to be the high level, and the differential signal Diff that is lower than the first comparison value and equal to or greater than the second comparison value, to be a low level, thereby calculating the output value OUTPUT.

The angle calculation unit 480 may calculate the rotation angle of the detected part from each of high-level and low-level interval intervals of the output value OUTPUT. For example, the angle calculation unit 480 may calculate the rotation angle from the interval between the high level and the low level of the output value OUTPUT.

As set forth above, according to various examples, rotation of a rotating body may be precisely detected by compensating for a process error of the rotating body and a tilt of a rotary shaft.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rotation sensing apparatus comprising:
    a detected part comprising a first pattern portion with a plurality of first patterns and a second pattern portion with a plurality of second patterns;
    a first sensor disposed opposite to the first pattern portion;
    a second sensor disposed opposite to the second pattern portion;
    a third sensor disposed at an angle from the first sensor and disposed opposite to the first pattern portion;
    a fourth sensor disposed at an angle from the second sensor and disposed opposite to the second pattern portion; and
    a rotation information calculation circuit configured to:
        calculate rotation information regarding rotation of a rotating body in response to a first oscillation signal generated based on an output of the first sensor, a second oscillation signal generated based on an output of the second sensor, a third oscillation signal generated based on an output of the third sensor, and a fourth oscillation signal generated based on an output of the fourth sensor; and
        compensate for nonlinearity of a differential signal generated by a difference between the first oscillation signal and the second oscillation signal, in response to an oscillation signal corresponding to one of a maximum frequency and a minimum frequency, from among the first oscillation signal, the second oscillation signal, the third oscillation signal, and the fourth oscillation signal.

2. The rotation sensing apparatus of claim 1, wherein the rotation information calculation circuit is configured to determine that the differential signal has a first nonlinearity in a case in which the oscillation signal corresponding to one of the maximum frequency and the minimum frequency corresponds to one of the first oscillation signal and the second oscillation signal.

3. The rotation sensing apparatus of claim 2, wherein the rotation information calculation circuit is configured to determine that the differential signal has a second nonlinearity different from the first nonlinearity in a case in which the oscillation signal corresponding to one of the maximum frequency and the minimum frequency corresponds to one of the third oscillation signal and the fourth oscillation signal.

4. The rotation sensing apparatus of claim 3, wherein the rotation information calculation circuit is configured to apply a first compensation algorithm, compensating for the first nonlinearity, to the differential signal, in the case in which the differential signal is determined as having the first nonlinearity, and to apply a second compensation algorithm, compensating for the second nonlinearity, to the differential signal, in the case in which the differential signal is determined as having the second nonlinearity.

5. The rotation sensing apparatus of claim 1, wherein the rotation information calculation circuit is configured to generate a first average signal by averaging the first oscillation signal and the second oscillation signal, and to generate a second average signal by averaging the third oscillation signal and the fourth oscillation signal.

6. The rotation sensing apparatus of claim 5, wherein the rotation information calculation circuit is configured to generate a first subtraction signal by subtracting the first average signal from the first oscillation signal, and to generate a second subtraction signal by subtracting the second average signal from the second oscillation signal.

7. The rotation sensing apparatus of claim 6, wherein the rotation information calculation circuit is configured to generate a first adjustment signal by a ratio of a frequency of the first subtraction signal to a difference between the maximum frequency and a frequency of the first average signal, and to generate a second adjustment signal by a ratio of a frequency of the second subtraction signal to a difference between the maximum frequency and a frequency of the second average signal.

8. The rotation sensing apparatus of claim 7, wherein the rotation information calculation circuit is configured to generate the differential signal by subtracting the second adjustment signal from the first adjustment signal.

9. The rotation sensing apparatus of claim 1, wherein the first oscillation signal and the third oscillation signal have a phase difference of 180 degrees, and the second oscillation signal and the fourth oscillation signal have a phase difference of 180 degrees.

10. The rotation sensing apparatus of claim 9, wherein the first oscillation signal and the second oscillation signal have a phase difference of 90 degrees, and the third oscillation signal and the fourth oscillation signal have a phase difference of 90 degrees.

11. A rotation sensing apparatus comprising:
a first sensor disposed opposite to a plurality of first patterns;
a second sensor disposed opposite to a plurality of second patterns, which has a certain angle difference from the plurality of first patterns;
a third sensor disposed opposite to the plurality of first patterns and having a certain angle difference from the first sensor;
a fourth sensor disposed opposite to the plurality of second patterns and having a certain angle difference from the second sensor; and
a rotation information calculation circuit configured to:
calculate rotation information regarding rotation of a rotating body, in response to a first sensing signal generated based on an output of the first sensor, a second sensing signal generated based on an output of the second sensor, a third sensing signal generated based on an output of the third sensor, and a fourth sensing signal generated based on an output of the fourth sensor; and
compensate for nonlinearity of a differential signal generated by a difference between the first sensing signal and the second sensing signal, in response to a sensing signal corresponding to one of a maximum frequency and a minimum frequency, from among the first sensing signal, the second sensing signal, the third sensing signal, and the fourth sensing signal.

12. The rotation sensing apparatus of claim 11, wherein the rotation information calculation circuit is configured to determine that the differential signal has a first nonlinearity in a case in which the sensing signal corresponding to one of the maximum frequency and the minimum frequency corresponds to one of the first sensing signal and the second sensing signal.

13. The rotation sensing apparatus of claim 12, wherein the rotation information calculation circuit is configured to determine that the differential signal has a second nonlinearity different from the first nonlinearity in a case in which the sensing signal corresponding to one of the maximum frequency and the minimum frequency corresponds to one of the third sensing signal and the fourth sensing signal.

14. The rotation sensing apparatus of claim 13, wherein the rotation information calculation circuit is configured to apply a first compensation algorithm, compensating for the first nonlinearity, to the differential signal, in the case in which the differential signal is determined as having the first nonlinearity, and to apply a second compensation algorithm, compensating for the second nonlinearity, to the differential signal, in the case in which the differential signal is determined as having the second nonlinearity.

15. The rotation sensing apparatus of claim 11, wherein the first sensing signal and the third sensing signal have a phase difference of 180 degrees, and the second sensing signal and the fourth sensing signal have a phase difference of 180 degrees.

16. The rotation sensing apparatus of claim 15, wherein the first sensing signal and the second sensing signal have a phase difference of 90 degrees, and the third sensing signal and the fourth sensing signal have a phase difference of 90 degrees.

* * * * *